May 24, 1960 J. B. FERGUSON 2,937,746
FISHING REEL PACKAGE
Filed Feb. 11, 1959 2 Sheets-Sheet 1

Inventor:
John B. Ferguson
By Silverman, Mueller & Cass
Attorneys.

May 24, 1960  J. B. FERGUSON  2,937,746
FISHING REEL PACKAGE
Filed Feb. 11, 1959  2 Sheets-Sheet 2
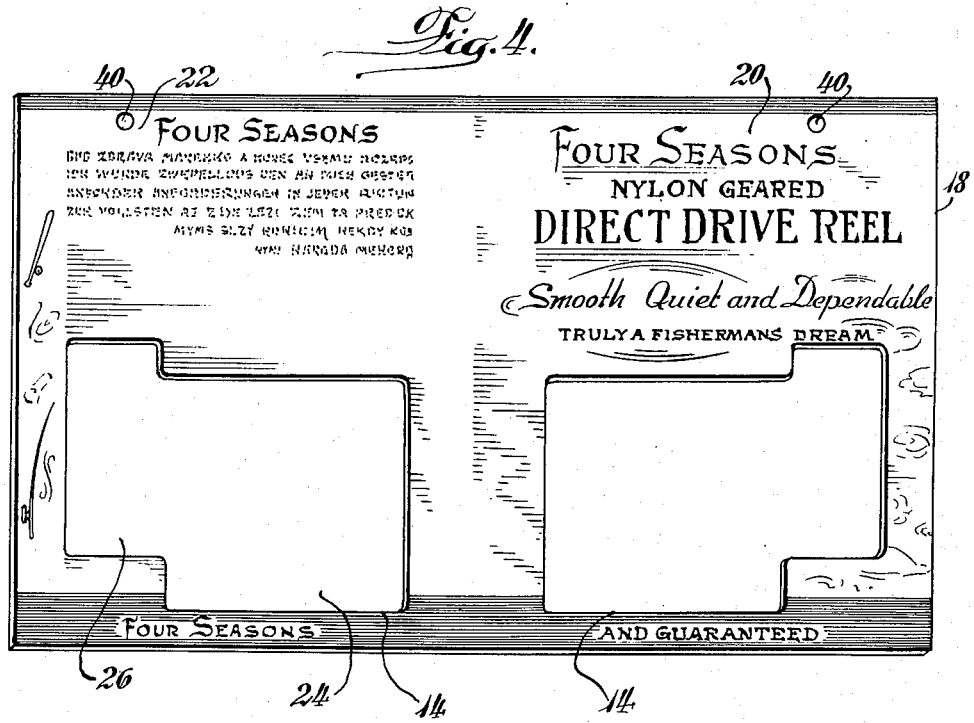
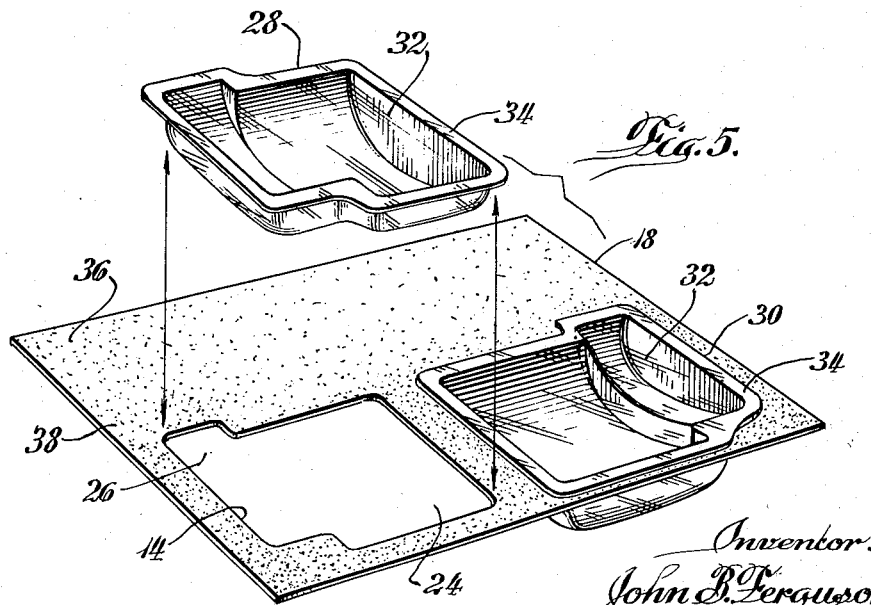

United States Patent Office 2,937,746
Patented May 24, 1960

2,937,746

FISHING REEL PACKAGE

John B. Ferguson, 547 W. Deming Place, Chicago, Ill.

Filed Feb. 11, 1959, Ser. No. 792,534

1 Claim. (Cl. 206—78)

This invention relates to new and improved means for packaging fishing reels so that the same may be visually examined without removal from the package. More particularly the invention relates to a combination display card and sealed fishing reel package which may be exhibited in such a manner as to encourage sales and self-service.

It is well known that heretofore fishing reels were invariably packaged in cardboard boxes or the like. Such packages, of course, did not permit visual examination of the reel without removal from the package. Thus the reels were usually displayed in enclosed glass showcases with at least the cover of the container removed, or they were stored on shelves with, perhaps, a counter display usually comprising a pictorial representation of the same. Since fishing reels are usually delicately balanced and made with considerable precision it was necessary heretofore to take considerable care in the storage of the same in order to avoid adversely affecting them by excessive exposure to dust, moisture, handling, etc.

It is therefore an important object of this invention to provide a fishing reel package which will overcome all of the disadvantages mentioned hereinabove.

Another important object of the invention is to afford a fishing reel package having the reel sealed therein in moisture-proof and airtight relationship.

A further object is to provide a sealed fishing reel package in which the fishing reel is positioned and displayed in full view so that the same may be viewed from all sides and in every direction thereby permitting at least visual examination of the construction and parts thereof without necessitating the removal of the reel from the package.

Still another object is to afford a combination display card and fishing reel package which may be hung on a hook in a self-service display or which may be displayed on a counter or shelf. A related object is to so design the package that when displayed on the supporting surface such as a counter or shelf the card and certain portions of the packaged reels will cooperate to maintain the packaged reels in upright position similar to an easel-supported picture.

Still a further object is to provide a package for fishing reels including relatively thin, transparent walls so designed however, that the fishing reel itself sufficiently reinforces said walls whereby the same then provides adequate protection for the reel.

Yet another object is to afford a fishing reel package which lends itself to rapid assembly-line packaging of the reel.

Yet a further object is to provide a fishing reel package of the character described which is most attractive, yet inexpensive but nevertheless sturdy and possessing many advantages over the usual packaging heretofore used.

With the foregoing and other objects in view which will appear as the description proceeds, the invention consists of certain novel features of construction, arrangement and a combination of parts hereinafter fully described, illustrated in the accompanying drawings, and particularly pointed out in the appended claim, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 4 is a plan view of a blank from which the card portion of the package may be made; and Fig. 5 is a perspective view of the reverse side of the card blank of Fig. 4, showing the transparent reel packaging members in the process of being assembled therein.

Figure 1:
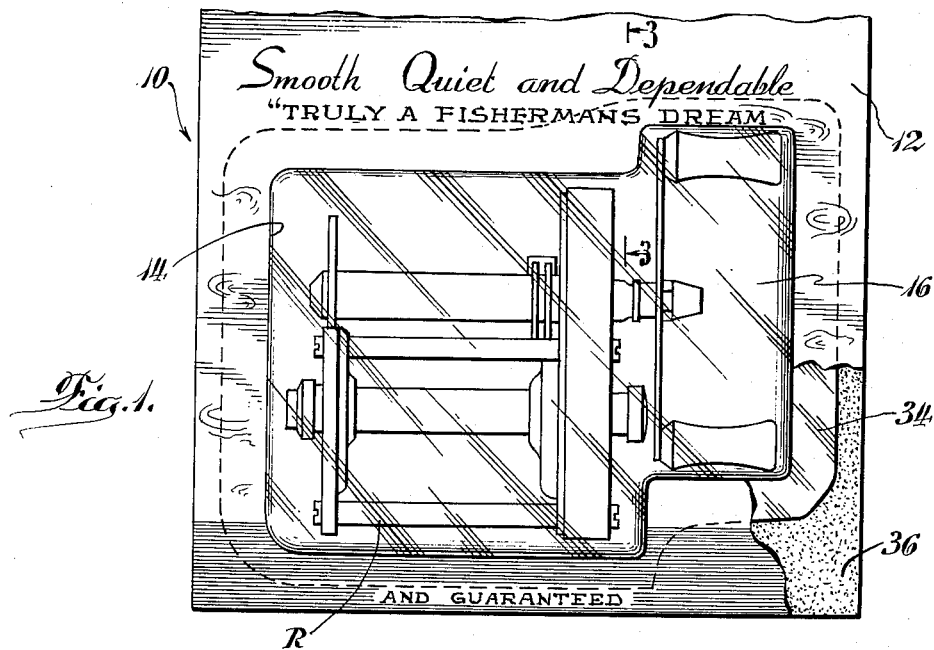
Fig. 1 is a fragmentary front elevational view of a packaged fishing reel embodying the principles of my invention, with a portion of one wall broke away to reveal certain details of construction.

Referring first to Fig. 1 of the drawings, reference numeral 10 indicates generally the combined display and fishing reel package comprising a card 12, which may be made of cardboard or similar pulp product, having a central cutout portion 14 in which is positioned a transparent housing 16 designed to house the fishing reel R. As shown in Fig. 4 of the drawings, the display card 12 may be formed from a blank 18 having an integrally-formed front portion 20 and a rear portion 22. Actually, the card 12 may be formed by folding the blank 18 along its mid-vertical axis so that the cutouts 14 are aligned one with the other as shown in Fig. 1 of the drawings. Suitable advertising and descriptive materials may be imprinted on both the front and rear surfaces 20 and 22 as shown in the several figures of the drawings.

It will be noted that the cutouts 14 are shaped to accommodate the reel R but with sufficient clearance so that substantially the entire reel, including all of its various parts and visible mechanisms, may be readily viewed and examined by the prospective purchaser. Thus each of the cutouts 14 is formed with a reel-accommodating portion 24 and a portion 26 within which may be positioned the handle of the reel. Actually, as shown in Fig. 1 of the drawings, the reel appears to be suspended in space without any portion thereof actually touching any portion of the card 12. The manner in which this is accomplished will be explained as the description proceeds.

The transparent housing 16 may be formed from a pair of complementary shaped, molded, transparent, plastic bubbles 28 and 30 (see Fig. 5). Each of these bubbles has a body portion 32, the contour of which is shaped to fit (or accommodate therein) approximately one-half of the reel R. Each bubble is further formed with a flange 34 encircling the marginal edges of the body portion 32. The bubbles 28 and 30 are further formed to fit exactly into the cutouts 14 with the flanges 34 abutting the marginal edges of the same, as shown in Fig. 5 of the drawings. It will further be noted that the bubbles 28 and 30 are positioned so that the flanges 34 abut the rear surface 36 of the card blank 18. The reason therefor will become apparent as the description proceeds.

Figure 3:
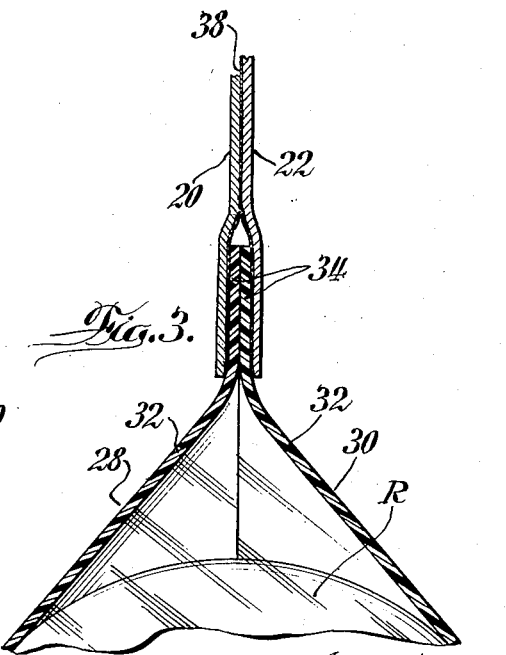
Fig. 3 is an enlarged fragmentary sectional view taken on the plane of line 3—3 in Fig. 1 of the drawings and viewed in the direction indicated.

The bubbles 28 and 30 may be made of any suitable, moldable, transparent, thermoplastic material such as many of the derivatives of cellulose acetate or the like. It should be further noted in Figs. 3 and 5 of the drawings that the back surface of the card blank 18 is coated with a layer 38 of a heat-sealing thermoplastic material which is compatible with the bubble material. The reason therefor will become apparent as the description proceeds.

In assembling the combination display card and fishing reel package, the molded bubbles 28 and 30 are first positioned within the respective cutouts 14 of the card blank 18 so that their flanges abut the plastic coating 38 of the back surface 36 of the card blank in the manner shown in Fig. 5 of the drawings. The reel is then placed in one of the bubbles and the card blank 18 folded over along its mid-axis so that the cutouts and bubbles contained therein are aligned one with the other. The folded assembly is then subjected to heat as by means of the electrode of a thermoplastic sealing machine, the shape of said electrode being such as to subject only the card portion 12 and bubble flanges 34 to the welding or sealing action. This, then seals the front and rear portions 20 and 22 of the card together throughout its entire area and further seals the flanges 34 to the adjacent portions of the card as will be readily noted in Fig. 3 of the drawings.

By this method there is afforded an airtight and watertight sealed transparent housing 16 containing therein the reel R. The shaped portions of the bubbles 28 and 30 bearing against the adjacent portions of the reel R maintain the reel in immovable position seemingly unsupported so that it appears to be "floating in air."

Figure 2:
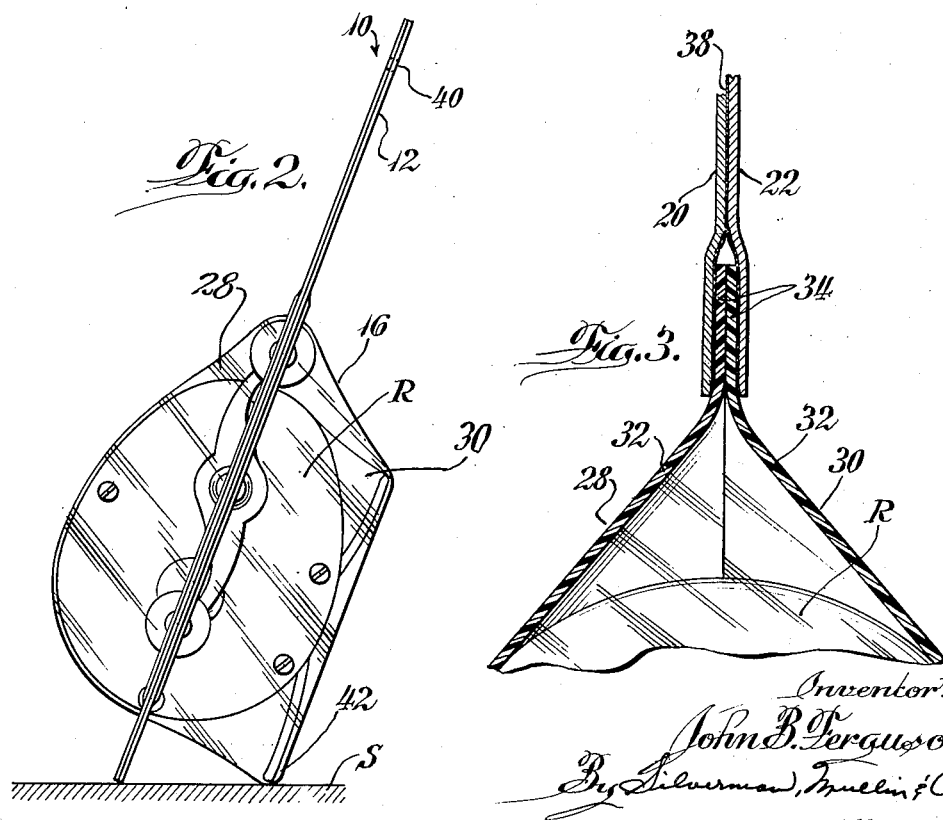
Fig. 2 is a side elevational view of the packaged reel showing the same self-supported in easel-like relationship on a flat surface.

If it is desired to display the packaged reel 10 on wall hooks on a self-service display rack the same may readily be done by punching a suitable hole 40 in an upper portion of the card 12 as shown in Figs. 2 and 4 of the drawings. The hole should be slightly off-set so that the uneven distribution of the weight of the reel will not prevent the card from being supported in substantially horizontal rather than inclined position when hung from a hook.

If it is desired to display the package reel 10 on a shelf or counter such as S in Fig. 2 of the drawings, this may readily be done since a lower protruding portion 42 of the reel R in the housing 16 serves as an easel to support the card in a substantially upright, albeit, slightly inclined plane. As further shown in Fig. 2 of the drawings it will be noted that a substantial portion of the walls of the bubbles 28 and 30 abut the reel R. Thus the reel R imparts sufficient strength and support to the bubble to insure suitable strength and rigidity thereto. Actually, the strength and rigidity of the thin plastic bubble is further insured by the uneven contour but generally arcuate dome-like shape of the body portion 32 of the bubbles.

From the foregoing description and drawings it should be apparent that I have provided an unique combination display card and container for fishing reels enabling the same to be merchandised by methods which were heretofore deemed impossible. It is of course well known that self-service merchandising represents the present trend, but that the same necessitates visible merchandise packaging. The package comprising the subject matter of this application obviously completely fills the requirements for such merchandising methods.

It is also well known that one of the few disadvantages of self-service merchandising is the inducement offered thereby for pilferage. By incorporating the reel package 16 into the display card 12 with its consequent large and bulky contour such pilferage is materially reduced because of the difficulty of slipping such a large and unwieldly package into a garment pocket or the like.

It should further be noted that since the reel is sealed against the admission of air, dust or moisture, the condition of the reel up to the time that the package is opened and the reel removed therefrom, remains substantially the same as when it was initially packaged therein at the factory. For the same reasons, the shelf life of the merchandise is considerably increased since the reel itself cannot be removed for handling or other abuses by the prospective buyer. On the other hand, nothing prevents the purchaser from visually examining every detail and visible surface of the reel from any angle or side. This, of course, the purchaser can do without any assistance from, or the requirement for, sales personnel. Actually, in self-service displays or racks, a single reel may be affixed or mounted on the rack so that the purchaser may test the operation of the reel.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claim.

What I claim and desire to secure by Letters Patent of the United States is:

A fishing reel package comprising in combination a fishing reel having an elongated rod engaging plate and an operating handle, a pair of peripherally flanged, rigid transparent plastic bubbles, said bubbles being complementarily shaped to enclose said fishing reel in contour enveloping relationship, a pair of complementary cardboard sheets bonded together to form a display card, said display card having an opening formed in a median portion thereof, said bubble flanges being immovably bonded to the inner surfaces of said sheets adjacent the marginal edges of said opening thereby forming an airtight housing in which said fishing reel is completely visible, said fishing reel being positioned in said bubbles so that said operating handle lies substantially in the plane of said display card, and said rod engaging plate protrudes rearwardly and outwardly of said display card on one side thereof with its end extending to a point adjacent but slightly above the bottom of said package, said plate thus supporting said package in inclined upright position on a horizontal supporting surface.

References Cited in the file of this patent

UNITED STATES PATENTS 2,491,423  Snyder _____ Dec. 13, 1949

FOREIGN PATENTS 958,491  France _____ Sept. 12, 1949